United States Patent
Wardojo et al.

(10) Patent No.: US 12,381,635 B1
(45) Date of Patent: Aug. 5, 2025

(54) METHOD AND SYSTEM FOR REVERSE POWERING A MULTI-UNIT OPTICAL NETWORK TERMINAL

(71) Applicant: FRONTIER COMMUNICATIONS HOLDINGS, LLC, Dallas, TX (US)

(72) Inventors: Erwin Wardojo, McKinney, TX (US); John Valdez, Copper Canyon, TX (US); Scott Mispagel, Allen, TX (US)

(73) Assignee: FRONTIER COMMUNICATIONS HOLDINGS, LLC, Dallas, TX (US)

( * ) Notice: Subject to any disclaimer, the term of this patent is extended or adjusted under 35 U.S.C. 154(b) by 0 days.

(21) Appl. No.: 18/957,328

(22) Filed: Nov. 22, 2024

Related U.S. Application Data

(60) Provisional application No. 63/719,004, filed on Nov. 11, 2024.

(51) Int. Cl.
*H04B 10/80* (2013.01)
*H04Q 11/00* (2006.01)

(52) U.S. Cl.
CPC ....... *H04B 10/808* (2013.01); *H04Q 11/0067* (2013.01); *H04Q 2011/0079* (2013.01)

(58) Field of Classification Search
CPC .................................................. H04B 10/808
See application file for complete search history.

(56) References Cited

U.S. PATENT DOCUMENTS

| | | | |
|---|---|---|---|
| 8,818,192 B1 | 8/2014 | Smith et al. | |
| 2006/0082222 A1* | 4/2006 | Pincu | G06F 1/3203 307/29 |
| 2007/0081549 A1 | 4/2007 | Cicchetti et al. | |
| 2010/0046940 A1 | 2/2010 | Cotton et al. | |
| 2010/0140365 A1 | 6/2010 | Kalore | |
| 2010/0310255 A1 | 12/2010 | Trojer | |
| 2011/0076866 A1 | 3/2011 | Powell | |
| 2014/0314412 A1 | 10/2014 | Soto et al. | |

(Continued)

OTHER PUBLICATIONS

Zuloaga et al., In-building telecommunications infrastructure, WIK, Dec. 2022.

(Continued)

*Primary Examiner* — Nathan M Cors
(74) *Attorney, Agent, or Firm* — MARSHALL, GERSTEIN & BORUN LLP

(57) ABSTRACT

Techniques for powering a multi-unit optical network terminal (MU-ONT) located outside of a multi-unit building include obtaining reverse power from Power-over-Ethernet (PoE) lines connecting the MU-ONT to terminal units (TUs) or customer premises equipments (CPEs) disposed inside the building. Reverse power may be injected into the PoE lines at the TUs, for example. Via an MU-ONT reverse powering device, the reverse power may be separated from services data provided via the PoE lines, and the services data may be delivered between the TUs and a Passive Optical Network (PON) via the MU-ONT. The reverse power obtained from the PoE lines may be aggregated to provide the MU-ONT with power commensurate with its power load. In some embodiments, the MU-ONT power load may be shared or distributed across PoE lines in a passive or actively controlled manner based on variations in the MU-ONT load and/or respective characteristics of the PoE lines.

28 Claims, 5 Drawing Sheets

(56) References Cited

U.S. PATENT DOCUMENTS

| | | | |
|---|---|---|---|
| 2014/0369687 A1* | 12/2014 | Jain | H04B 10/27 307/42 |
| 2015/0078756 A1 | 3/2015 | Soto et al. | |
| 2016/0020911 A1 | 1/2016 | Sipes, Jr. et al. | |
| 2016/0241341 A1 | 8/2016 | Endo et al. | |
| 2016/0330334 A1 | 11/2016 | Cooper et al. | |
| 2017/0063542 A1 | 3/2017 | Vilella et al. | |
| 2017/0078455 A1 | 3/2017 | Fisher et al. | |
| 2017/0110885 A1 | 4/2017 | Cheng et al. | |
| 2017/0111976 A1 | 4/2017 | Van Endert | |
| 2017/0220098 A1 | 8/2017 | Wang | |
| 2017/0237497 A1 | 8/2017 | Yogeeswaran et al. | |
| 2017/0237506 A1 | 8/2017 | Soto et al. | |
| 2018/0331767 A1 | 11/2018 | Shurki et al. | |
| 2019/0182056 A1 | 6/2019 | Ramanujam et al. | |
| 2019/0289374 A1 | 9/2019 | Vilella | |
| 2020/0235607 A1 | 7/2020 | Kanarellis et al. | |
| 2020/0313771 A1 | 10/2020 | Nakashima | |
| 2020/0351117 A1 | 11/2020 | Barnett, Jr. | |
| 2020/0351118 A1 | 11/2020 | Barnett, Jr. | |
| 2021/0075520 A1 | 3/2021 | Soto et al. | |
| 2021/0176648 A1 | 6/2021 | Labadie et al. | |
| 2021/0281352 A1* | 9/2021 | Clatanoff | H04B 10/27 |
| 2022/0052874 A1 | 2/2022 | Cananzi | |
| 2022/0303012 A1 | 9/2022 | Takamuku et al. | |
| 2023/0011720 A1 | 1/2023 | Synstelien et al. | |
| 2023/0198616 A1 | 6/2023 | Bluschke et al. | |
| 2024/0098323 A1 | 3/2024 | Biggs | |

OTHER PUBLICATIONS

Rose, Connecting power supplies in parallel or series for increased output power, Bel Fuse, downloaded from the Internet at: https://www.belfuse.com/resource-library/blog/power-supplies-in-series-or-parallel-for-increased-power, Jun. 2020.

* cited by examiner

METHOD AND SYSTEM FOR REVERSE POWERING A MULTI-UNIT OPTICAL NETWORK TERMINAL

CROSS-REFERENCE TO RELATED APPLICATIONS

This application claims priority to and the benefit of the filing date of U.S. Provisional Patent Application No. 63/719,004, filed on Nov. 11, 2024 and entitled "REVERSE POWERING A MULTI-UNIT OPTICAL NETWORK TERMINAL," the entire disclosure of which is hereby expressly incorporated by reference herein.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A conventional passive optical network (PON) includes one or more optical line terminals (OLTs), which are typically disposed at central locations, connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT) or an optical network unit (ONU) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter. A fiber distribution terminal (FDT) may be utilized to connect feeder optical fibers to distribution optical fibers, for example.

A PON may provide services to multiple service locations within a multi-unit building which, as generally referred to herein, may be a building which is subdivided into multiple units, where each unit may require a separate account or instance of PON optical services. Examples of such multi-unit buildings include, for example, apartment and condominium buildings, duplexes, townhomes, office buildings, dormitories, strip malls, and the like; that is, those buildings in which PON services are separately provided to different multiple units (e.g., multiple tenants, multiple customers, etc.) within the building. Commonly, a multi-unit building is serviced by a Multi-Unit Optical Network Terminal (MU-ONT) which is typically disposed or mounted on the exterior of the building, e.g., on an outside wall or roof of the building. An MU-ONT may be, for example, an Optical Line Terminal (OLT), a Multi-Dwelling Unit (MDU) ONT, a router, a switch, etc., and may be a node of the PON. The MU-ONT includes an optical network interface via which the MU-ONT is optically connected to the PON, e.g., via one or more optical fibers, and also includes multiple customer-facing interfaces into which multiple lines or cables are received, where the multiple lines or cables communicatively connect the MU-ONT to multiple terminating units (TUs) located within the building. The multiple TUs may include, for example, Customer Premises Equipments (CPEs) such as modems, routers, residential gateways, and the like, and each TU may provide optical services (via the MU-ONT) to a respective end-user or customer of the PON. Different TUs may be located in and service different units within the multi-unit building.

A common problem with MU-ONTs, though, is that the MU-ONT does not have easy access to a source of power to power its operations. That is, many times a power source that is external to (e.g., outside of) the building (e.g., on or near the location of the MU-ONT or a fiber drop location associated with the MU-ONT) is not readily available. Further, to bring outdoor power to MU-ONT locations is costly and time consuming, as doing so may require utilizing a third-party electrician. Still further, in some situations, powering MU-ONTs by using an outside power source (e.g., a third-party power source external to the building) may not even be possible given permits, homeowners' association (HOA) requirements and regulations, and/or jurisdictional regulations.

BRIEF SUMMARY OF THE INVENTION

In an embodiment, a method includes obtaining an indication of a power load of a Multi-Unit Optical Network Terminal (MU-ONT) disposed on an exterior of a building, where the MU-ONT is optically connected to a passive optical network (PON) and communicatively connected, via a set of Power over Ethernet (PoE) lines, to one or more terminating units (TUs) disposed within an interior of the building. The MU-ONT is configured to receive, via the PON, optical signals and transmit, via the set of PoE lines to respective TUs, respective payloads of the received optical signals. Additionally, the method includes determining, based on one or more characteristics associated with the set of PoE lines, a distribution of the power load across the set of PoE lines; and causing the MU-ONT to be supplied with reverse power received via the set of PoE lines in accordance with the distribution.

In an embodiment, a system includes one or more tangible memories storing thereon computer-executable instructions that, when executed by one or more processors, cause the system to obtain an indication of a power load of a Multi-Unit Optical Network Terminal (MU-ONT) disposed on an exterior of a building. The MU-ONT is optically connected to a passive optical network (PON) and communicatively connected, via a set of Power over Ethernet (PoE) lines, to one or more terminating units (TUs) disposed within an interior of the building. Additionally, the MU-ONT is configured to receive, via the PON, optical signals, and transmit, via the set of PoE lines to respective recipient TUs, respective payloads of the received optical signals. The computer-executable instructions are further executable to cause the system to determine, based on one or more characteristics associated with the set of PoE lines, a distribution of the power load of the MU-ONT across the set of PoE lines; and cause the MU-ONT to be supplied with reverse power received via the set of PoE lines in accordance with the distribution.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention and explain various principles and advantages of those examples.

Figure 1:
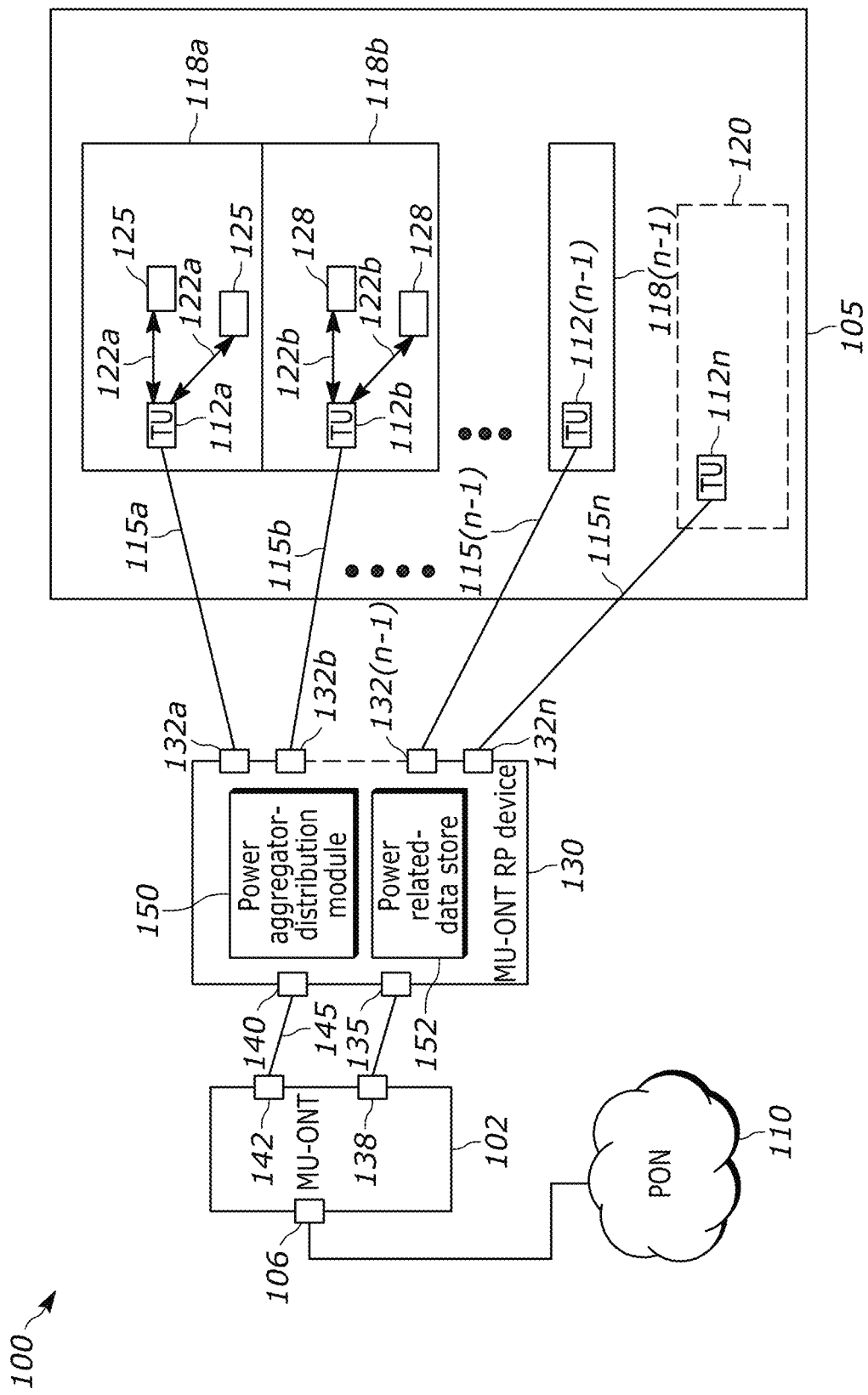
FIG. 1 is a block diagram of an example system for reverse powering a Multi Unit Optical Network Terminal (MU-ONT) in which the systems, methods, and/or techniques of the present disclosure may be implemented.
Figure 2:
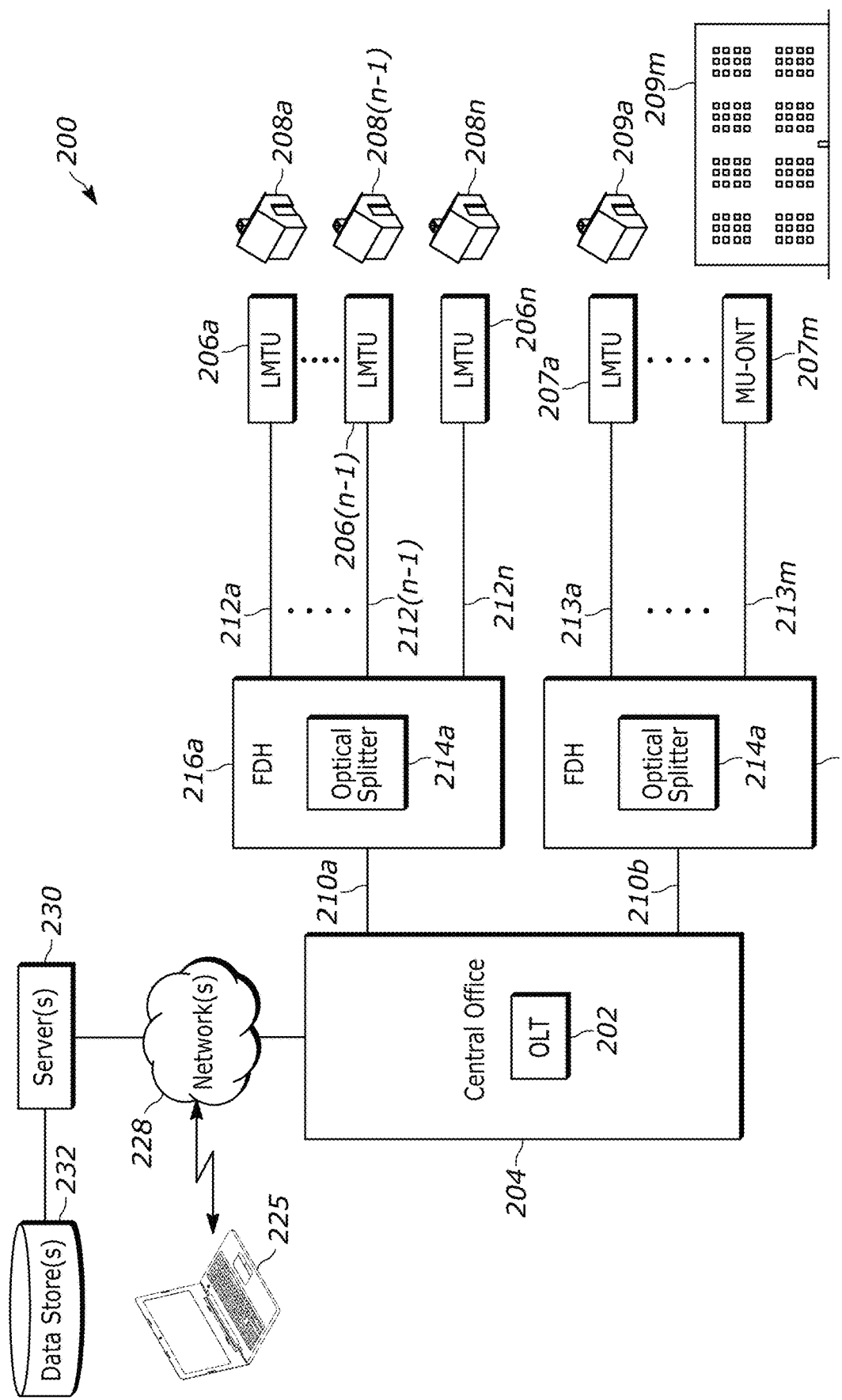
FIG. 2 is a block diagram of an example Passive Optical Network (PON) which may operate in conjunction with the systems, methods, and techniques of the present disclosure.

For example, the example MU-ONT of FIG. 1 may be a node of the example PON of FIG. 2.

Figure 3A:
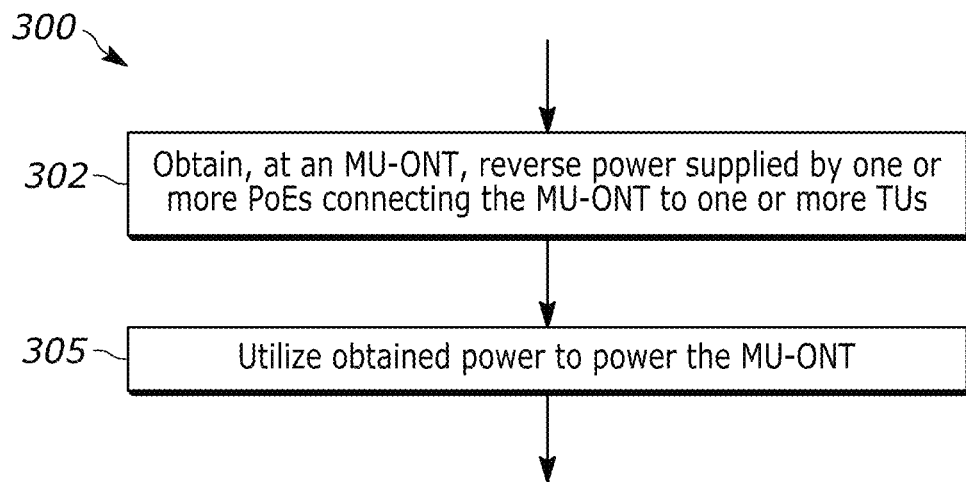

FIG. 3A is a flow diagram of an example method which may be performed by an MU-ONT, such as the example MU-ONT of FIG. 1.

Figure 3B:
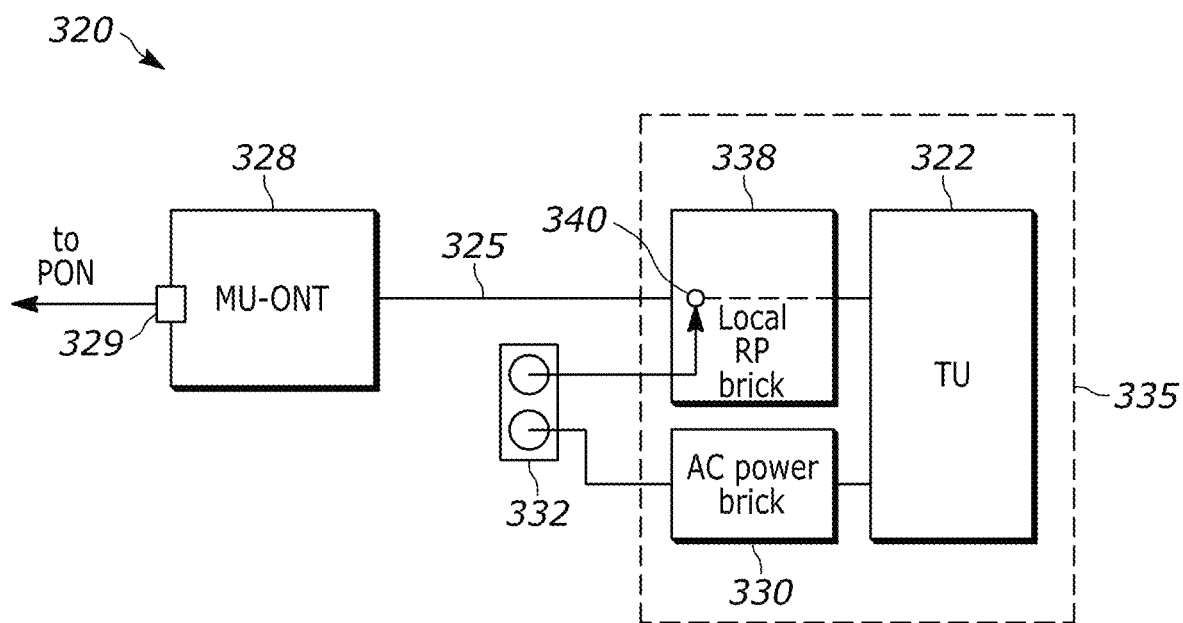

FIG. 3B is a block diagram of an example local reverse power injection configuration, which may be utilized in conjunction with the principles and techniques described herein.

Figure 3C:
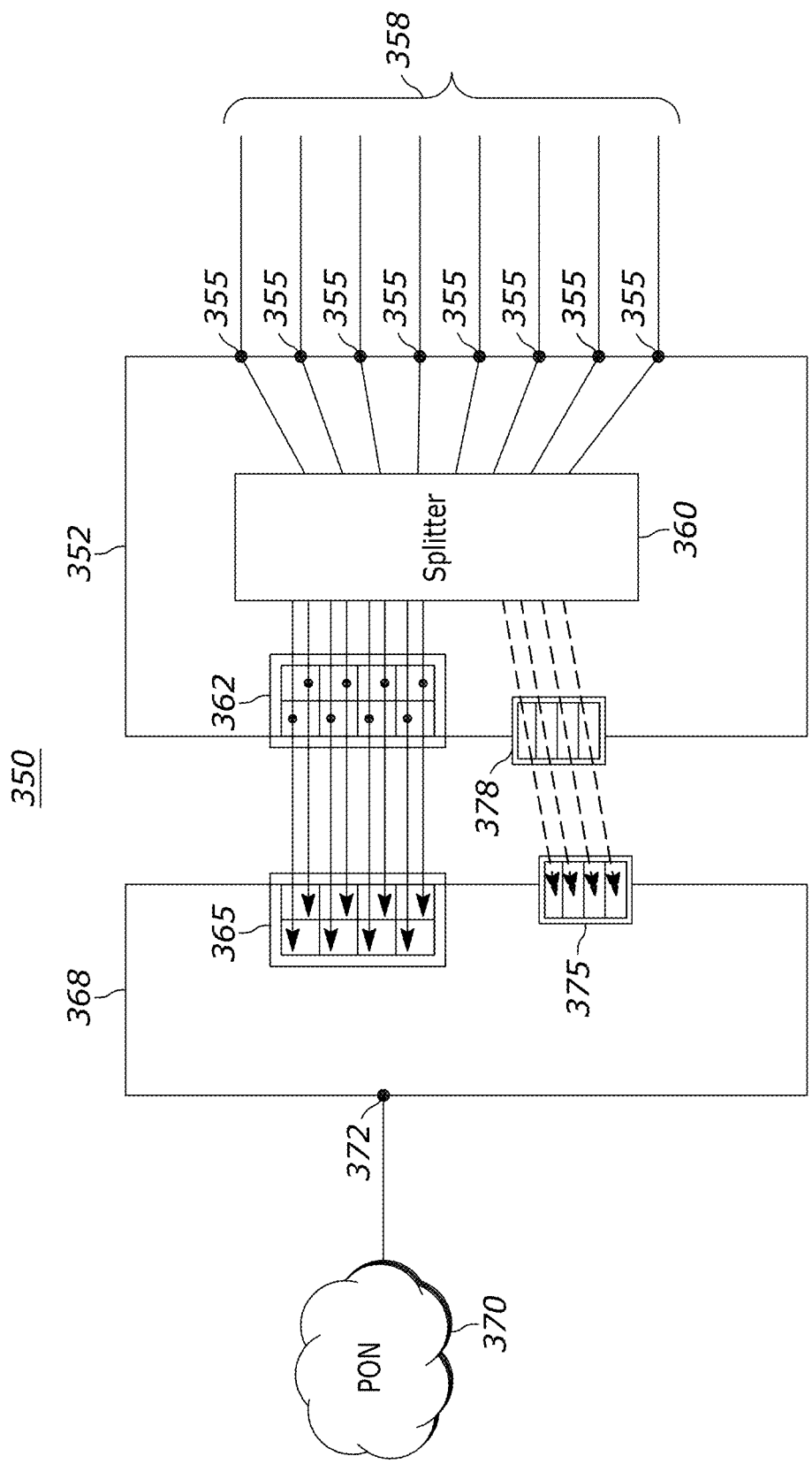

FIG. 3C is a block diagram of an example configuration of providing reverse power to an MU-ONT via multiple PoE lines, which may be utilized in conjunction with the principles and techniques described herein.

Figure 4:
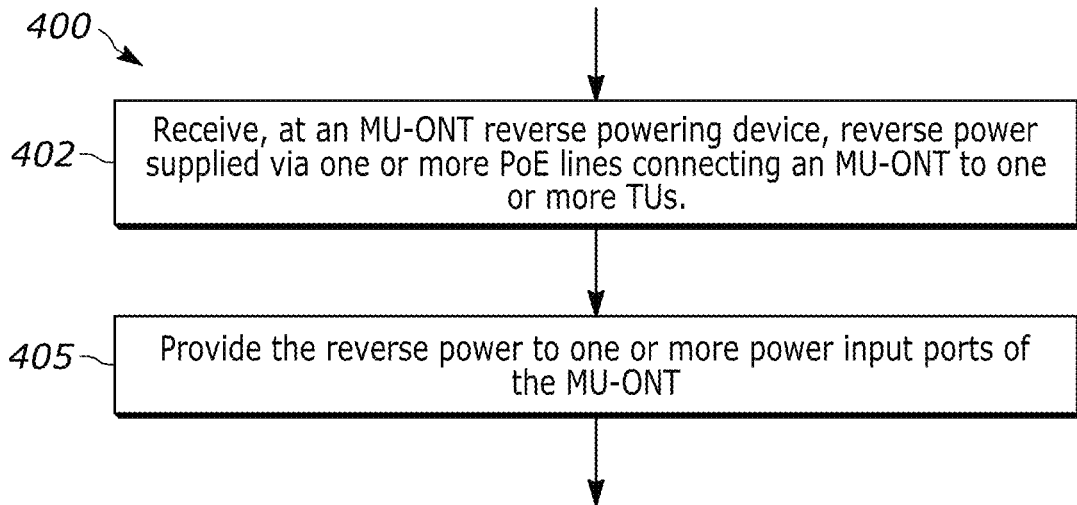

FIG. 4 is a flow diagram of an example method which may be performed by a reverse powering (RP) device of an MU-ONT, such as the example MU-ONT reverse powering device of FIG. 1.

Figure 5:
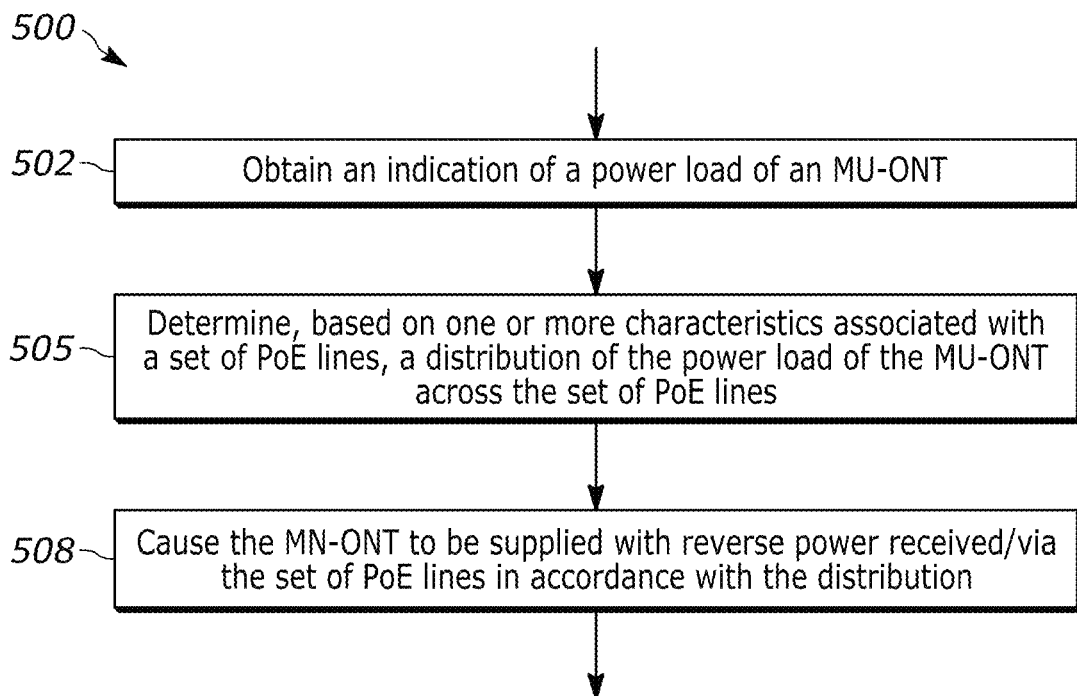

FIG. 5 is a flow diagram of an example method for reverse powering an MU-ONT, such as the example MU-ONT of FIG. 1.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

The methods, systems, devices, concepts, and techniques described herein are generally directed to reverse powering a Multi-Unit Optical Network Terminal (MU-ONT) that is installed on or mounted to the exterior of a building, e.g., by using power sources located within the building. An MU-ONT may be an active network element or node (e.g., a terminal) of a Passive Optical Network (PON), and an MU-ONT may enable multiple (e.g., different) end-users or customers who are located in a same building to receive respective optical services provided via the PON. An MU-ONT is typically mounted on an exterior wall or roof of a building, and includes one or more network-facing optical network interfaces into which one or more optical fibers optically connecting the MU-ONT to a Passive Optical Network (PON) are received. Optical services may be provided to the customers located inside the building via the MU-ONT and the PON. Additionally, an MU-ONT typically includes one or more (and typically multiple) end-user facing communication interfaces into which lines or cables which communicatively connect the MU-ONT to one or more (and typically multiple) Terminating Units (TUs) disposed within the building are received. The TUs may service respective units, rooms, or areas within the multi-unit building, for example, and a TU may be a Customer Premises Equipment (CPE) such as a modem, router, residential gateway, etc. Within a unit being serviced by a TU, the TU may establish a wireless network (such as a Wi-Fi network and/or other types of short-range wireless networks) to which various consumer electronic devices (e.g., smart devices, televisions, smart home appliances, computers, telephones, IoT devices, etc.) located within the unit may connect and via which the various consumer electronic devices may receive and consume optical services provided via the PON and MU-ONT.

Within the building, the lines or cables communicatively connecting the TUs to the MU-ONT may include Power over Ethernet (PoE) lines or cables, such as Cat6 and/or Cat6A Ethernet lines or cables. PoE lines or cables (which are generally and categorically referred to herein as "PoE lines") are able to support both the delivery of data (e.g., signals, messages, metadata, payload, content, etc.) related to the optical services as well as the delivery of electric power within a single, physical cable or line. For example, a PoE line may be a twisted pair or copper Ethernet cable over which both power (e.g., direct current or DC power) and data (e.g., optical services-related data) can be delivered to endpoints of the PoE line or cable (which are typically the MU-ONT and a respective TU disposed within the building).

The disclosed techniques, methods, systems, devices, and concepts may reverse power an MU-ONT by utilizing a MU-ONT reverse powering (RP) device, which is referred to interchangeably herein as a "reverse powering device," "RP device," or "MU-ONT RP device." The MU-ONT RP device may be disposed between the MU-ONT and the TUs which the MU-ONT services. For example, the MU-ONT RP device may be a device that is separate and distinct from the MU-ONT, or the MU-ONT RP may be included in the MU-ONT. At any rate, the MU-ONT RP device may be configured to obtain reverse power supplied via the PoE lines that connect the in-building TUs to the externally-mounted MU-ONT, and the MU-ONT RP subsequently may direct or provide the supplied reverse power to the MU-ONT to utilize for powering its operations, e.g., via input power ports of the MU-ONT. When multiple PoE lines supply reverse power, the MU-ONT RP may aggregate the reverse power supplied by the multiple PoE lines. Additionally, the MU-ONT RP may distribute the power load of the MU-ONT across the multiple supplying PoE lines, and may automatically adjust the distribution of the MU-ONT power load as various PoE lines are activated, deactivated, or otherwise experience changes in their respective supply of reverse power and/or other characteristics of the PoE lines. Additionally or alternatively, the MU-ONT RP may automatically adjust the distribution of the MU-ONT power load as the power demands of the MU-ONT RP change. The MU-ONT RP device may also be configured to obtain, via the PoE lines, any data generated by the TUs (e.g., signals, messages, metadata, and other types of payload content related to optical services), and may direct or provide the data generated by the TUs to the MU-ONT for transmission over the PON. As such, in a sense, the MU-ONT RP device may be configured to split content that is received via the PoE lines connecting the TUs with the MU-ONT into a power feed and a data feed, and provide the power feed and the data respectively to input power ports and data ports of the MU-ONT (which may be existing, legacy power and data ports of the MU-ONT). Further, the MU-ONT RP device may be configured to aggregate the reverse power received via multiple PoE lines and provide the aggregated reverse power to the MU-ONT. Consequently, via the MU-ONT RP device, the MU-ONT may readily obtain power to power its operations without requiring the use of any power source that is located outside of the building (e.g., without the use of any external or third-party power source), and in some cases without requiring additional (new) ports at the MU-ONT to do so, and without requiring any new chases or conduits to be installed at the building other than those already provided for access and routing the PoE lines to TUs within the building.

In the opposite, downstream direction (e.g., in the direction away from the PON and towards the end-user service locations), the MU-ONT RP device may obtain any data related to optical services (e.g., signals, messages, metadata, and other types of payload content related to the optical services) that has been received by the MU-ONT from the PON via the optical fiber(s) and a network-facing optical interface of the MU-ONT, and the MU-ONT RP device may direct or provide the received optical service-related data to respective TUs located within the building, e.g., via the PoE lines received at the MU-ONT RP device. As such, in an embodiment, the MU-ONT reverse powering device may, in a sense, in the downstream direction serve as a switch or router of various incoming data packets and/or streams that are received at the MU-ONT servicing the multi-unit building so that the incoming data packets and/or streams are routed to the intended TUs (e.g., the intended consumers or recipients) within the multi-unit building, and in the upstream direction serve as a power aggregator and/or power source of the MU-ONT. In an alternate embodiment, in the downstream direction the MU-ONT may perform the switching and/or routing of the data packets and/or streams received from the PON, while the MU-ONT RP serves as a data pass-through device in the downstream direction and serves as a power aggregator and/or power source of the MU-ONT in the upstream direction.

Example Environment for Reverse Powering MU-ONTs

To illustrate, FIG. 1 depicts an example environment 100 in which the concepts, techniques, methods, systems, and/or devices disclosed herein may be implemented. FIG. 1 depicts a Multi-Unit Optical Network Terminal (MU-ONT) 102 that is mounted on the outside of (e.g., on an external or exterior face of a wall or roof of) a multi-unit building 105. The MU-ONT 102 is optically connected, via an optical network interface 106 and one or more optical fibers 108, to a Passive Optical Network (PON) 110 via which the MU-ONT 102 can receive optical services to deliver to multiple terminating units (TUs) 112a, 112b, . . . , 112(n−1) disposed inside of the multi-unit building 105. TUs 112a-112n are communicatively connected to MU-ONT 102 via respective PoE lines or cables 115a, 115b, . . . , 115(n−1), 115n. As depicted in FIG. 1, TU 112a, TU 112b, and TU 112(n−1) are respectively disposed in different units 118a, 118b, and 118(n−1) of the multi-unit building 105, whereas TU 112n is disposed in a common area 120 of the building 105 (e.g., in a hallway, utility room, laundry room, basement, etc.). As also depicted in FIG. 1, TU 112a is a node of a local wireless network 122a servicing the unit 118a and via which one or more consumer electronic devices 125 disposed within the unit 118a may communicatively connect, and TU 112b is a node of a local wireless network 122b servicing the unit 118b and via which one or more consumer electronic devices 128 disposed within the unit 118b may communicatively connect. The local wireless networks 122a, 122b may operate by using any one or more short-range wireless communication technologies, such as Wi-Fi, Bluetooth, etc. In FIG. 1, TU 112n disposed in common area 120 is not connected to any local wireless area network, and is not wirelessly connected to any consumer electronics devices disposed within the building 105, As such, the TU 112n may solely serve as a reverse power supply for the MU-ONT 102.

The example environment 100 further includes a MU-ONT reverse powering device 130 disposed in between the MU-ONT 102 and the TUs 110. While the MU-ONT RP device 130 is shown in FIG. 1 as being mounted on the exterior of the building 105, this is for ease of illustration purposes only. For example, the MU-ONT RP device 130 may be mounted or disposed somewhere within or inside the building 105, such as in common area 120 and/or on the internal face of the wall or roof on which the MU-ONT 102 is externally mounted. Further, while the MU-ONT RP device 130 is shown in FIG. 1 as being a separate and distinct device from the MU-ONT 102, this is for ease of illustration purposes only. Indeed, in some embodiments, the MU-ONT RP device 130 may be included in the MU-ONT 102; that is, the MU-ONT 102 and the MU-ONT RP device 130 may be an integral device or, said another way, the MU-ONT 102 may include the MU-ONT RP device 130.

At any rate, as shown in FIG. 1, MU-ONT reverse powering device 130 includes one or more downstream-facing (e.g., in the direction of the end-users TU 112 and away from the PON 110) ports or communication interfaces 132a-132n into which PoE lines 115a-115n are received. As such, the ports 132a-132 are interchangeably referred to herein as "PoE ports" of the MU-ONT RP device 130. In the upstream-facing direction (e.g., in the direction of the PON 110), the MU-ONT RP device 130 includes one or more power output ports 135 via which reverse power supplied via PoE lines 115a-115n may be provided to MU-ONT 102, e.g., via one or more power input ports 138 of the MU-ONT 102. The power input ports 138 of the MU-ONT 102 may include one or more 48 volt DC ports, for example. Additionally, MU-ONT RP device 130 includes one or more data ports or communication interfaces 140 via which data corresponding to PON optical services that has been received at MU-ONT RP device 130 via the PoE lines 115 may be provided to MU-ONT 102, e.g., via one or more data ports 142 of the MU-ONT 102. The data ports 140, 142 (and therefore cable or line 145 connecting the ports 140 and 142) may support Ethernet, Internet Protocol (IP), and/or any other data protocol and/or delivery mechanism, for example, and may or may not be PoE Ethernet ports.

Additionally, in FIG. 1, the MU-ONT RP device 130 is shown as including a power aggregation-distribution module 150. In an embodiment, the power aggregation-distribution module 150 may comprise a set of computer-executable instructions that are stored on one or more tangible memories of the MU-ONT RP device 130 and which may be executed by one or more processors of the MU-ONT RP device 130 to cause the MU-ONT RP device 130 to perform any one or more of the methods disclosed herein, and/or portions thereof. In some implementations, a power aggregation-distribution module 150 may be stored at one or more servers (which may or may not be one or more servers of the PON 110), and an instance of the stored power aggregation-distribution module 150 may be downloaded to or provisioned into the MU-ONT RP device 130, e.g., via the PON 110 or via a technician computing device. The power aggregation-distribution module 150 may cause the MU-ONT RP device 130 to aggregate reverse power provided via two or more of the PoE lines 115a-115n, and provide the aggregated reverse power to the MU-ONT 102, e.g., via power output ports 135. Additionally or alternatively, the power aggregation-distribution module 150 may determine a distribution scheme of a power load of the MU-ONT 102 (e.g., of a required, utilized, and/or demanded power load), and may aggregate and/or provide the reverse power supplied by the PoE lines 115a-115n in accordance with the distribution scheme, such as in manners described in more detail elsewhere herein. Data indicative of the distribution scheme as well as other data generated and/or utilized by the power aggregation-distribution module 150 may be stored in a power-related data store 152 of the MU-ONT RP device 130, for example.

The inclusion of the power aggregation-distribution module 150 and the power-related data store 152 in the MU-ONT reverse powering device 130 as shown in FIG. 1 is only one of several possible embodiments, though. For example, in an embodiment, the power aggregation-distribution module 150 (or portions thereof) may be included in the MU-ONT 102. Additionally or alternatively, the power-related data store 152 (of portions thereof) may be included in the MU-ONT 102.

Example Passive Optical Network (PON)

FIG. 2 is a block diagram of an example PON 200 which may operate in conjunction with the systems, methods, and techniques of the present disclosure. For example, the PON 200 may be the PON 110 of FIG. 1, in an embodiment. The example PON 200 includes one or more optical line terminals (OLTs) (an example one of which is designated by reference numeral 202) at a central location (e.g., at a central office 204) optically connecting to one or more last mile termination units (LMTUs) 206a, . . . , 206n at respective customer premises 208a, . . . , 208n. The last mile termination units 206a, . . . , 206n may be located outside and/or inside the customer premises or locations 208a, . . . , 208n. Each last mile termination unit 206a, . . . , 206n may be, for example, an optical network unit (ONU) or an optical network terminal (ONT). For One or more of the LMTUs 206a-206n may be an MU-ONT, such as the MU-ONT 102 of FIG. 1.

The example PON 200 is implemented using instances of point-to-multipoint topology. For example, in the example PON 200, a first feeder optical fiber 210a from the OLT 202 (which is interchangeably referred to herein as an "F1 optical fiber 210a" or a "primary optical fiber 210a") serves the one or more last mile termination units 206a, . . . , 206n via respective distribution optical fibers 212a, . . . , 212n (which are interchangeably referred to herein as "F2 optical fibers 212a, . . . , 212n" or "secondary optical fibers 212a, . . . , 212n"). In the illustrated example, the first feeder optical fiber 210a is optically coupled to the plurality of last mile termination units 206a, . . . , 206n via an example one-to-many optical splitter 214a which is disposed, located, implemented, etc. in an example fiber distribution hub (FDH) 216a. In some arrangements, the FDH 216a is located within a geographic area (e.g., a neighborhood) such that the customer premises 208a, . . . , 208n are proximally close to the FDH 216a, and typically each of the customer premises 208a, . . . , 208n and respective last mile termination units 206a, . . . , 206n is disposed at a different optical distance from the FDH 216a. An "optical distance," as generally utilized herein, refers to a distance over which an optical signal travels or is delivered.

In embodiments, the PON 200 may or may not include additional feeder optical fibers and optical splitters for a plurality of additional customer premises. Moreover, a PON may or may not include a plurality of FDHs. For example, as shown in FIG. 2, the example PON 200 includes a second feeder or primary optical fiber 210b from the OLT 202 that is optically coupled to another plurality of last mile termination units 207a-207m at respective customer premises 209a-209m via another many-to-one optical splitter 214b included in another fiber distribution hub 216b and via respective secondary optical fibers 213a-213m. As depicted in FIG. 2, the LMTU denoted by reference 207m is an MU-ONT, such as the MU-ONT 102 of FIG. 1, which services a multi-unit building 209m, such as the multi-unit building 105 of FIG. 1.

As utilized herein, the "components" of the PON 200 generally refer to the devices, nodes, and optical fibers of the PON 200. For example, the components of the PON 200 shown in FIG. 2 may include the OLT 202, the FDHs 216a, 216b, the splitters 214a, 214b, the LMTUs 206a-206n and 207a-207m, and the optical fibers interconnecting the devices or nodes, e.g., the optical fibers 210a-210b, 212a-212n, and 213a-213m.

In some scenarios, an optical terminal (e.g., the OLT 202 and/or one or more the last mile termination units 206a-206n,207a-207m) may transmit optical test signals and/or patterns, indication light, and/or other types of measurement signals into an optical fiber in response to control signals received from a computing device. For example, the OLT 202 and/or the one or more LMTUs 206a-206n, 207a-207m may receive control signals from a computing device 225 (e.g., a laptop, a computer, a tablet, a mobile phone, etc.) associated with a service technician or other agent of the PON 200. In some examples, the computing device 225 controls an optical terminal of the PON 200 via one or more networks 228 (which may include one or more wired and/or wireless private networks and/or public networks, such as the Internet), and/or by direct interaction with the optical terminal (e.g., via a hotspot provided by the optical terminal, a service port of the optical terminal, etc., not shown in FIG. 2). Additionally and/or alternatively, control signals may be received from one or more servers 230 of the PON 200 that are used to manage the PON 200, the network(s) 228, etc. For example, the one or more servers 230 may schedule and execute diagnostics of various components of the PON 200 and/or of the PON 200 as a whole, generate alerts and alarms, initiate various actions, provide user interfaces, which may include graphical user interfaces (e.g., at the computing device 225), log, historize, and/or otherwise store data generated by and associated with the PON 200 (e.g., in one or more data stores 232), and the like. For example, one or more applications may execute at the server(s) 230 and/or the server(s) may host one or more services to provide management, administrative, and/or test functionalities of the PON 200.

Various information and data associated with, utilized by, and/or generated by the PON 200 may be stored in the data stores 232 of the PON 200. For example, the data store(s) 232 may store records of customer contact events with a technical support organization supporting the PON 200, service call records, records of operating conditions and events which occurred, logbooks, and the like. Additionally, the data store(s) 232 may store applications which may execute at the one or more servers 230, and/or which may be downloaded or otherwise provided to the technician computing device 225 for installation and execution thereon. Further, the data store(s) 232 may store data indicative of performance, faults, diagnostics, statuses, states, and/or other data corresponding to the components of the system 200. Still further, the data store(s) 232 may store data indicative of the architecture, infrastructure, and component connectivity of the PON 200, including identifications of various PON components and indications of which PON components connect to which other PON components. Of course, the data store(s) 232 may store any updates to any and all of the information and data stored therein.

Example Method at an MU-ONT

FIG. 3A illustrates a block diagram of an example method 300 which may be performed at least in part by a Multi Unit ONT, such as the MU-ONT of FIG. 1 or the MU-ONT 207$m$ of FIG. 2. In an example implementation, an MU-ONT may include one or more tangible memories storing a set of computer-executable instructions thereon, where the stored set of computer-executable instructions, when executed by one or more processors of the MU-ONT, may cause the MU-ONT to perform at least a portion (or all) of the method 300. For ease of discussion and not for limitation purposes, the method 300 is described herein with simultaneous reference to FIGS. 1 and 2. Further, in embodiments, the method 300 may execute in conjunction with at least portions of any other one or more methods described herein. Still further, in embodiments, the method 300 may include additional and/or alternate steps or actions, if desired.

At a block 302, the method 300 may include obtaining, by a Multi-Unit Optical Network Terminal (MU-ONT) that is disposed on an exterior of a building and that is optically connected to a passive optical network (PON), reverse power supplied by or via one or more Power over Ethernet (PoE) lines connecting the MU-ONT to respective one or more terminating units (TUs) disposed within an interior of the building. The building may be a multi-unit building, such as an apartment building, an office building, a dormitory, etc. having multiple units corresponding to multiple different customers, end-users, or in-building service locations of the PON. For example, the building may be the building 105, the PON may be the PON 110, the MU-ONT may be the MU-ONT 102, the one or more PoE lines may be one or more of the PoE lines 115$a$-115$n$, and the one or more TUs may be one or more TUs 112-112$n$ of FIG. 1.

The one or more TUs may include one or more CPEs that are respectively servicing different units within the multi-unit building, where each CPE may be a local router, modem, switch, etc. corresponding to a respective serviced unit (such as TUs 112$a$-112($n$-1) respectively servicing units 118$a$-118($n$-1), for example). At least one of the TUs disposed within the building (e.g., TU 112$n$) may not service any specific unit within the building, but instead may be disposed in a common area of the multi-unit building, such as a basement, attic, utility room, hallway, entry way, etc. Such TUs (e.g., TU 112$n$) may or may not be a node of any in-building local wireless network. Said another way, such TUs (e.g., TU 112$n$) may or may not allow or provide mechanisms for other devices to wirelessly connect thereto.

The MU-ONT may be, for example, an Optical Line Terminal (OLT), a Multi Dwelling Unit (MDU) ONT, a switch, a router, or similar device that optically connects the multi-unit building to the PON and thereby is able to provide optical services to various TUs within the multi-unit building. Accordingly, the MU-ONT may be a terminal or node of the PON, and as such may be configured to receive optical signals via the PON and transmit, route, and/or provide payload of the optical signals to respective TUs within the building for consumption at the TUs, e.g., in accordance with respective optical services provided at the TUs. Similarly, the MU-ONT may be configured to receive signals generated by the TUs which correspond to optical services, and may be configured to generate and transmit, via the PON, optical signals which include the payloads of the signals generated by the TUs.

The reverse power obtained 302 by the MU-ONT via the one or more PoE lines may have been injected into the one or more PoE lines, for example, locally at corresponding TUs. An example embodiment of a configuration 320 for locally injecting reverse power into a PoE line is shown in FIG. 3B. In the local reverse power injection configuration 320, a TU 322 that is disposed within the interior of a multi-unit building is communicatively connected, via a PoE line 325, to an MU-ONT 328 servicing the multi-unit building, where the MU-ONT 328 is disposed on the exterior of the multi-unit building and is optically connected to a passive optical network (PON) via an optical network interface 329. For example, the TU 322 may be one of the TUs 112$a$-112($n$-1) of FIG. 1, the PoE line 325 may be a corresponding PoE line 115$a$-115($n$-1) of FIG. 1, the MU-ONT 328 may be the MU-ONT 102, and optical network interface 329 may be the optical network interface 106 of FIG. 1. Data (e.g., signaling, payload, metadata, etc.) corresponding to optical services provided via a PON (e.g., the PON 110) may be delivered between the MU-ONT 328 and the TU 322 via the PoE line 325, e.g., such as in manners described elsewhere herein.

In the local reverse power injection configuration 320, the TU 322 itself may be supplied with power via an alternating current (AC) power brick or device 330 which is connected to (e.g., plugged into) mains power 332. Typically, mains power 332 is provided via an outlet within the unit 335 being serviced by the TU 322. The configuration 320 may also include a local reverse power (RP) brick or device 338 which is also connected to (e.g., plugged into) mains power 332, e.g., via the same or a different outlet as the TU 322 located within the unit 335, or via an outlet which is located outside of the unit 335 but nonetheless disposed inside the multi-unit building. The local RP brick 338 may be configured to convert AC power obtained from mains power 332 into PoE-compatible power, and to inject 340 the converted, PoE-compatible power into the PoE line 325 for supplying reverse power to the MU-ONT 328. For example, the local RP brick 335 may include a converter which converts AC power obtained from mains power 332 into PoE type 3 power or PoE type 4 power (e.g., PoE type 3 at a minimum), and the local RP brick 338 may inject 340 the converted power into the Cat6/Cat6A Ethernet cable 325 connecting the TU 322 to the MU-ONT 328. It is understood that although FIG. 3B illustrates power being injected 340 into the PoE line 325 at or near the TU 322, this is only one possible implementation. Indeed, a local RP brick 338 via which power may be injected 340 into the PoE line 325 may be located anywhere along the length of the PoE line 325 within the interior of the building, as desired.

When PoE line 325 is the only PoE line providing reverse power to the MU-ONT 328, the reverse power injected 340 into the PoE line 325 may include at least 50 watts of power. For example, the injected reverse power supplied to the MU-ONT 328 via the only PoE line 325 may include 50-60 watts of power. In an embodiment, the only PoE line 325 (which may be a PoE type 3 line, as a minimum) may be in accordance with the IEEE 802.3bt standard, the maximum power per port may be 60 watts, the power to the powered device (e.g., to the MU-ONT 328) may be at least 51 watts, the PoE line 325 may include a 2- or 4-pair twisted pair, the operational voltage of the PoE line 325 may be 50 to 57 volts, and the voltage to the powered device (e.g., to the MU-ONT 328) may be 42.5 to 57 volts.

In some implementations, multiple PoE lines may provide reverse power to the MU-ONT 328. That is, the MU-ONT 328 may obtain an aggregation of the reverse power provided by the multiple PoE lines. In these implementations, a respective local reverse power injection configuration 320 corresponding to each TU of multiple TUs disposed within the multi-unit building may be utilized to reverse power the MU-ONT 328. For example, a respective reverse power injection configuration 320 may be implemented for two or more (or all) of the TUs 112a-112n (e.g., for two or more (or all) of the PoE lines 115a-115n of the TUs 112a-112n) disposed within the building 105. In these situations, the power load required by the MU-ONT 328 may be shared across the multiple PoE lines providing reverse power to the MU-ONT 328 (e.g., in an aggregate or collective manner), and the injected reverse power provided to the MU-ONT 328 via the multiple PoE lines may include at least 50 watts of power in total. For example, the injected reverse power provided to the MU-ONT 328 via the multiple PoE lines may include 50-60 watts of power in total.

To illustrate, FIG. 3C depicts an example configuration 350 of providing reverse power to an MU-ONT via multiple PoE lines. The example configuration 350 includes an MU-ONT reverse power (RP) device 352 which may be, in an embodiment, the MU-ONT RP device 130 of FIG. 1. The MU-ONT RP device 352 includes a plurality of PoE ports 355 into which a plurality of PoE lines 358 are received, where power has been injected (e.g., has been locally injected) into each of the PoE line 358, e.g., in manners such as discussed elsewhere herein. Each PoE line 358 may terminate at a respective TU located within a multi-unit building. As such, each PoE port 355 may receive, via a respective PoE line 358, data generated by a respective TU (where the generated data may be related to signaling, payload, metadata, and/or other information corresponding to optical services) as well as injected power (where the power may have been injected at the respective TU or somewhere else along the length of the respective PoE line 358 within the building).

The MU-ONT RP device 352 includes a splitter 360 which splits power received via the PoE lines 358 from the data received via the PoE lines 358. The splitter 360 may be connected to a plurality of data ports 362 of the MU-ONT RP device 352, and the splitter 350 may route the (split-out) data received via PoE lines 358 to the plurality of data ports 362, which are communicatively connected to a plurality of data ports 365 of an MU-ONT 368. The data ports 362 of the MU-ONT RP device 352 and the data ports 365 of the MU-ONT 368 may be Ethernet-compatible data ports, in an embodiment. Thus, within the MU-ONT RP device 352, the splitter 360 may be connected to both the plurality of PoE ports 355 as well as the plurality of plurality of data ports 362. Further, the MU-ONT 368 may be optically connected to a PON 370 via optical network interface 372, and may transmit optical signals including the payloads of the split-out data to the PON 370 via the optical network interface 372. The MU-ONT 368 may be the MU-ONT 102, the plurality of data ports 365 of the MU-ONT 368 may be the data ports 142 of the MU-ONT 102, the optical interface 372 of the MU-ONT 368 may be the optical network interface 106, and the PON 370 may be the PON 110, for example.

On the other hand, the splitter 360 may provide the (split-out) power supplied by the PoE lines 358 to one or more input power ports 375 of the MU-ONT 368 via one or more output power ports 378 of the MU-ONT RP device 352. As such, within the MU-ONT RP device 352, the splitter 360 may be connected to both the plurality of PoE ports 355 as well as the plurality of plurality of output power ports 378. The one or more input power ports 375 of the MU-ONT 368 may include at least one DC power port, such as a 48 Volt DC power port, and the MU-ONT 368 may utilize the power obtained via its input power ports 375 to power its operations. The total power received via the input power ports 375 of the MU-ONT 368 may be at least 50 watts. For example, the power received via the input power ports 375 of the MU-ONT 368 may include 50-60 watts of power in total, and/or may include sufficient power (in total) to support the power load required or utilized by the MU-ONT 368. As such, the power load of the MU-ONT 368 may be shared across multiple PoE lines 358. For example, as more PoE lines 358 are connected into the MU-ONT RP device 352, the newly connected PoE lines 358 may assume some portion of the power load of the MU-ONT 368.

The sharing of the power load required by the MU-ONT 368 may be performed via passive or active load sharing mechanisms. For example, the multiple connected PoE lines 358 may operate as parallel power supplies for the MU-ONT 368 so that the load is evenly distributed or balanced among the PoE lines 358. Active feedback mechanisms such as droop sharing and/or active current sharing may be utilized to ensure that each PoE line 358 contributes equally or evenly to the load.

In some situations, voltage feedback control loops and/or mechanisms may be utilized to actively control load sharing. In an example, one of the PoE lines 358 may have inconsistent input voltage and/or input voltage that exceeds some boundary condition. The MU-ONT RP device 352 may be omit the inconsistently-behaving PoE line 358 from load sharing so that its injected power is not supplied (or is prevented from being supplied) to the MU-ONT 368. In another example, the MU-ONT RP device 352 may include a voltage regulator (not shown) which may monitor respective input voltages supplied by each of the PoE lines 358 and maintain a constant output voltage at the output power ports 378 of the MU-ONT RP device 352 irrespective of variations of input voltages of the PoE lines 358 and/or irrespective of changing load conditions of the MU-ONT 368. In yet another example, the MU-ONT RP device 352 may include a controller (not shown) which may monitor the respective current supplied by each of the PoE lines 358 and may adjust (e.g., may control) the output voltages of the output power ports 378 of the MU-ONT RP device 352 so that the load is balanced or shared among the PoE lines 358. Thus, in some situations, the sharing of the power load of the MU-ONT 368 across multiple PoE lines 358 may include distributing the power load of the MU-ONT 368 across the PoE lines 358 based on respective characteristics of the multiple PoE lines, such as input current and/or input voltage, which may result in an unequal distribution of the MU-ONT power load across the multiple PoE lines 358.

Advantageously, in some embodiments, the data ports 365 and the input power ports 375 of the MU-ONT 368 are existing data ports 365 and input power ports 375. That is, when the MU-ONT 368 is a legacy MU-ONT, the legacy MU-ONT 368 need not be retrofitted or re-configured to support being supplied with reverse power from PoE lines disposed within the building to which the MU-ONT 368 is mounted. By simply plugging in MU-ONT RP device 352 into the existing data ports and the existing input power ports of the legacy MU-ONT 368, and by plugging the PoE lines 358 into the PoE ports 355 of the MU-ONT RP device 352, the legacy MU-ONT 368 may be easily be provided with power supplied by the PoE lines 358, e.g., such as by using techniques described in detail elsewhere herein.

Further, while the MU-ONT RP device 352 is depicted in FIG. 3C as being a separate and distinct device from the MU-ONT 368, this is for ease of illustration purposes only. Indeed, in some embodiments, the MU-ONT RP device 352 may be included in the MU-ONT 368; that is, the MU-ONT 368 and the MU-ONT RP device 352 may be an integral device. As such, the MU-ONT 368 may include the PoE ports 355 into which the PoE lines 358 are received and the splitter 360, for example.

Returning now to FIG. 3A, at a block 305, the method 300 may include utilizing the obtained reverse power to power the MU-ONT. For example, the reverse power supplied by at least some of the PoE lines 115a-115n may be utilized to power the MU-ONT 102, and the reverse power supplied by at least some of the PoE lines 358 may be utilized to power the MU-ONT 368. In some implementations, the reverse power supplied by the PoE lines is the only power which is utilized to power the MU-ONT. That is, the MU-ONT may not obtain and/or utilize power provided by any third-party power source or any external power source located outside of (external to) the multi-unit building, with the possible exception of a back-up battery for the MU-ONT.

Example Method at an MU-ONT Reverse Powering Device

FIG. 4 illustrates a block diagram of an example method 400 which may be performed at least in part by an MU-ONT reverse powering device, such as the MU-ONT RP 130 of FIG. 1 or the MU-ONT RP device 352. In an example implementation, an MU-ONT RP may include one or more tangible memories storing a set of computer-executable instructions thereon, where the stored set of computer-executable instructions, when executed by one or more processors of the MU-ONT RP device, may cause the MU-ONT device to perform at least a portion (or all) of the method 400. The set of computer-executable instructions may include the power aggregation-distribution module 150, for example. For ease of discussion and not for limitation purposes, the method 400 is described herein with simultaneous reference to FIGS. 1, 2, and FIGS. 3A-3C. Further, in embodiments, the method 400 may execute in conjunction with at least portions of any other one or more methods described herein. Still further, in embodiments, the method 400 may include additional and/or alternate steps or actions, if desired.

At a block 402, the method 400 may include receiving, at an MU-ONT reverse powering device, reverse power supplied via one or more PoE lines communicatively connecting an MU-ONT disposed on the exterior of a building with one or more TUs disposed within the interior of the building. The MU-ONT reverse powering device may be disposed in between the MU-ONT and the one or more TUs. Accordingly, each PoE line may be received into a respective PoE port of the MU-ONT RP device, and each PoE line may connect the reverse powering device to a respective Terminating Unit (TU) disposed within an interior of a multi-unit building. As previously discussed, the MU-ONT may be installed or otherwise located on the exterior of the building (e.g., on an exterior wall or rooftop of the building). The MU-ONT may be a terminal or endpoint of a PON which provides optical services that are delivered via the PON to respective TUs located within the building, and different TUs may service different units or customers within the building, for example. As such, the MU-ONT may be an Optical Line Terminal (OLT), a Multi Dwelling Unit (MDU) ONT, a switch, or a router, and at least some of the TUs may be CPEs such as local routers, modems, switches, etc. corresponding to respective serviced units. In some implementations, at least one of the TUs within the building may not provide data services to any other device located inside the building, but may solely operate as a reverse power source for the MU-ONT via its respective PoE line. Such TUs may be disposed in common areas of the building, if desired.

In some embodiments, the receiving 402 of the reverse power supplied by the one or more PoE lines may include receiving power which has been injected into the one or more PoE lines. For example, each PoE line may be connected to a respective local reverse power brick, such as the local RP brick 338. The local RP brick may convert mains power into PoE-compatible power, and inject the converted power into the POE line for delivery, along with any optical services related data, to the MU-ONT reverse powering device (and thus eventually the MU-ONT) via the PoE line. As previously discussed, the local RP brick may be co-located within the same unit as the TU serviced by the PoE line, or may be located anywhere along the length of the PoE line inside of the building.

At a block 405, the method 400 may include providing, by the MU-ONT reverse powering device, the reverse power supplied by the one or more PoE lines to one or more power input ports of the MU-ONT. The one or more power input ports of the MU-ONT may include at least one 48 V DC power input port, and/or may be legacy power input ports of the MU-ONT, for example. In an embodiment, the MU-ONT reverse powering device may provide 405 the reverse power to the one or more power input ports of the MU-ONT via one or more power output ports of the MU-ONT reverse powering device, where the one or more power output ports connect the MU-ONT reverse powering device to the one or more power input ports of the MU-ONT. The amount of power supplied to the MU-ONT via the one or more power output ports of the MU-ONT reverse powering device may be in accordance with tolerances and/or required load of the MU-ONT. For example, the power supplied to the MU-ONT by the MU-ONT reverse powering device may be at least 50 watts of power, and in some cases between 50 to 60 watts of power. Accordingly, when only a single PoE supplies reverse power, the power supplied by the single PoE and provided by the MU-ONT reverse powering device to the MU-ONT may include 50-60 watts of power.

When multiple PoE lines supply reverse power, though, the method 400 may include sharing or distributing a power load of the MU-ONT across the multiple PoE lines (not shown). The distribution of the MU-ONT power load may be predetermined, and/or may utilize passive and/or active distribution techniques or mechanisms. For example, the distribution of the MU-ONT power load across the multiple PoE lines may be an even or balanced distribution. Additionally or alternatively, when another PoE line is added and activated, the distribution of the power load of the MU-ONT may automatically re-adjust so that the newly activated PoE line contributes to the supplied reverse power. Still additionally or alternatively, if one of the multiple PoE lines has an output voltage or current over a threshold, the distribution of the power load of the MU-ONT may automatically re-adjust to exclude the PoE line having the out-of-limit behavior or to control the output provided to the MU-ONT based on the out-of-limit behavior of the PoE line.

In some embodiments, the distribution of the power load across multiple, active PoE lines may vary over time as characteristics of the PoE lines change and/or as the load required by the MU-ONT changes. For example, the distribution of the power load may be based on respective input currents and/or respective input voltages that are detected by the MU-ONT reverse powering device at the PoE ports into which the PoE lines are received, and/or may be based on changes in load demands (e.g., currents, voltages, power, etc.) of the MU-ONT. In some implementations, the MU-ONT reverse powering device may include control mechanisms corresponding to input voltages and/or currents of the PoE lines (e.g., as detected at the PoE ports of the MU-ONT reverse powering device), and/or corresponding to output voltages and/or currents of the MU-ONT reverse powering device (e.g., as provided by the MU-ONT reverse powering device via its power output ports connected to the MU-ONT). For example, the MU-ONT reverse powering device may include a controller which performs active current sharing, e.g., by monitoring the respective current of each PoE line at the PoE ports and adjusting the respective power and/or voltage supplied by each PoE line based on current measurements of the PoE lines so that the desired load distribution across the multiple PoE lines is achieved. The MU-ONT reverse powering device may perform droop sharing, e.g., by monitoring the load current of the MU-ONT and decreasing voltages of each PoE line as the MU-ONT load current increases to thereby achieve the desired load distribution. The MU-ONT reverse powering device may include a voltage regulator that maintains a relatively constant output voltage at the one or more power output ports of the MU-ONT reverse powering device via which power is provided to the MU-ONT even while input voltages (e.g., as measured at the PoE ports of the MU-ONT reverse powering device) and/or the load conditions (e.g., as measured at the power output ports of the MU-ONT reverse powering device) vary. Of course, other techniques and/or mechanisms for sharing or distributing the power load of the MU-ONT across the multiple PoE lines are possible, and may be implemented by the MU-ONT reverse powering device.

Of course, typically, but not necessarily, the MU-ONT reverse powering device may also deliver, to respective TUs, data related to optical services (e.g., signals, payload, metadata, and/or other types of data) which has been received at the MU-ONT via the PON, and may deliver data related optical services (e.g., signals, payload, metadata, and/or other types of data) which has been generated by the TUs to the MU-ONT for transmission via the PON. As such, in some embodiments (not shown), the method 400 may include receiving, by the MU-ONT reverse powering device via the one or more PoE lines and the one or more PoE ports, signals generated by the one or more TUs, and providing, via one or more data ports connecting the MU-ONT reverse powering device to the MU-ONT, the signals received via the one or more PoE lines (or payloads thereof) for delivery over the PON of which the MU-ONT is a node. Additionally or alternatively, the method 400 may include receiving, at the MU-ONT reverse powering device and via the one or more data ports, signals corresponding to respective payloads of optical signals that have been received by the MU-ONT via the PON, and transmitting or forwarding the signals received via the one or more data ports (or payloads thereof) to respective TUs within the building via the one or more PoE ports and the one or more PoE lines.

Example Method of Reverse Powering an MU-ONT

FIG. 5 illustrates a block diagram of an example method 500 of reverse powering an MU-ONT, such as the MU-ONT 102 of FIG. 1 or the MU-ONT 207*m* of FIG. 2. In an embodiment, the method 500 may be performed at least in part by an MU-ONT RP device, such as the MU-ONT RP device 130 of FIG. 1 or the MU-ONT RP device 352 of FIG. 3C. In an embodiment, the method 500 may be performed at least in part by an MU-ONT, such as the MU-ONT 102 of FIG. 1, the MU-ONT 207*m* of FIG. 2, or the MU-ONT 368 of FIG. 3C. In an embodiment the method 500 may be performed in conjunction by both an MU-ONT and an MU-ONT RP device, such as in conjunction by both the MU-ONT 102 and the MU-ONT RP device 130 of FIG. 1, or in conjunction both by the MU-ONT 368 and the MU-ONT RP device 352 of FIG. 3C. In an embodiment, the method 500 may be performed by one or more processors executing a set of computer-executable instructions that are stored on one or more tangible memories. The set of computer-executable instructions may include the power aggregation-distribution module 150 of FIG. 1, for example. For ease of discussion and not for limitation purposes, the method 500 is described herein with simultaneous reference to FIGS. 1, 2, 3A-3C, and 4. Further, in embodiments, the method 500 may execute in conjunction with at least portions of any other one or more methods described herein. Still further, in embodiments, the method 500 may include additional and/or alternate steps or actions, if desired.

At a block 502, the method 500 may include obtaining, by one or more processors, an indication of a power load of a Multi-Unit Optical Network Terminal (MU-ONT) that is located outside of a building which the MU-ONT services. As discussed elsewhere herein, the MU-ONT may be installed or otherwise located on the exterior of the building (e.g., on an exterior wall or rooftop of the building), and the MU-ONT may be a terminal or endpoint of a passive optical network (PON) which provides optical services that are delivered via the PON to respective TUs located within the interior of the building, e.g., via respective PoE lines connecting the MU-ONT to the TUs. The different TUs may service different units or customers within the building, for example, and accordingly the building may be a multi-unit building. Consequently, the MU-ONT may be an Optical Line Terminal (OLT), a Multi Dwelling Unit (MDU) ONT, a switch, or a router, and at least some of the TUs may be CPEs such as local routers, modems, switches, etc. corresponding to respective serviced units, where the TUs may communicate with other end-user devices (e.g., consumer and/or personal electronic devices, smart home appliances, computers, telephones, IoT devices, etc.) within the respective service units via respective local wireless networks established to service the respective units, e.g., in manners such as described elsewhere herein.

Generally speaking, the MU-ONT may be optically connected via an optical interface to the PON and communicatively connected to the terminating units (TUs) disposed within the interior of the building via the set of Power over Ethernet (PoE) lines. As such, the MU-ONT may receive, via the PON and the optical interface of the MU-ONT, optical signals related to optical services, and may transmit, via the set of PoE lines, respective payload of the received optical signals to respective recipient TUs. Additionally, the MU-ONT may receive, via the PoE lines, data related to the optical services (e.g., signals, payload, metadata, and/or other types of data) which has been generated by the TUs, and may transmit the data from the building via the optical interface of the MU-ONT and the PON. In some buildings, at least one of the TUs within the building may not provide services to any other device located inside the building, but may solely operate as a reverse power source via its respective PoE line. Such TUs may be disposed in common areas of the building, if desired.

As also discussed elsewhere herein, in some arrangements an MU-ONT reverse powering device may be disposed in between the MU-ONT and the PoE lines to which the TUs are connected. In these arrangements, the MU-ONT RP device may split reverse power that is supplied by the PoE lines from the data that is received via the PoE lines (where the received data is typically generated by the TUs). The MU-ONT RP device may provide the supplied power to one or more input power ports of the MU-ONT to thereby power the MU-ONT, and may provide the received data to one or more data ports of the MU-ONT, e.g., for delivery via the PON. The MU-ONT RP device may be a separate device from the MU-ONT, or may be an integrated device. In some implementations, the MU-ONT RP device may be included in the MU-ONT. Accordingly, at the block 502, the one or more processors may be included in the MU-ONT and/or in the MU-ONT RP device.

Additionally at the block 502, the power load of the MU-ONT may be a required power load or a presently-detected or presently-needed power load (e.g., a present power load demand), and the one or more processors may obtain the indication of the power load of the MU-ONT in various manners. For example, an operating range of a current, voltage, and/or wattage at input power port(s) 142 of the MU-ONT 102 may be predetermined or specified, and an indication of the operating range(s) may be stored in the power related data store 152 and accessed during an execution of the method 500. Additionally or alternatively, a load current and/or a load voltage of the MU-ONT may be monitored and/or sensed during operations (e.g., by the MU-ONT 102 and/or by the MU-ONT RP device 130), where the amount of load current and/or load voltage may be indicative of the power load of the MU-ONT 102. For example, the MU-ONT RP device 130 may include sensors which measure the load current and/or load voltage of the MU-ONT at one or more power outputs 140, or the MU-ONT 102 may include one or more sensors which measure its load current and/or load voltage At a block 505, the method 500 may include determining, by the one or more processors and based on one or more characteristics associated with the set of PoE lines, a distribution of the power load of the MU-ONT across the set of PoE lines. The one or more characteristics associated with the set of PoE lines and based on which the distribution of the MU-ONT power load is determined 505 may include respective PoE line-specific characteristics such as the voltage and/or current of each PoE line at a respective PoE port, whether the PoE line has or does not have injected reverse power, whether the PoE line is active or inactive, etc. For example, in situations in which the set of PoE lines includes only one PoE line which is supplying reverse power (for instance, a PoE line terminating at a TU located in a common area within the interior of the multi-unit building, or when only one unit of the multi-unit building includes a TU presently servicing a PON customer and/or into which power is injected), the determining 505 of the distribution of the power load of the MU-ONT may include determining that an entirety of the power load is to be supplied by the only one PoE line. In other situations, when the set of PoE lines includes multiple PoE lines which are active and supplying injected power, the determining 505 of the distribution of the MU-ONT power load may include determining that the distribution of the power load of the MU-ONT is to be a shared distribution across the multiple PoE lines. For example, the distribution may be determined 505 to be an even, equal, or balanced distribution across the multiple PoE lines.

In some embodiments, the determining 505 of the distribution of the MU-ONT power load across the multiple PoE lines may include determining 505 that the distribution is an unequal distribution across the multiple PoE lines. For example, the distribution may include allocating shares or portions (which may or may not be differently-sized shares or portions) of the MU-ONT power load to different PoE lines based on the relative values or measurements of respective PoE line characteristics (e.g., respective current, voltage, availability, unavailability, etc.). That is, the power load of the MU-ONT may be shared across the multiple MU-ONTs in accordance with the relativity of the respective characteristics among the multiple PoE lines.

In some embodiments, the determining 505 of the distribution of the MU-ONT power load across the multiple PoE lines may include determining 505 the distribution based on a measure of consistency of a value of a particular characteristic of PoE lines over time (e.g., the consistency of a current, voltage, availability, unavailability, etc. of a PoE line over time), such as measured or detected at the PoE ports into which the PoE lines are received. When such a measure of consistency of the particular characteristic crosses a threshold for a particular PoE line (e.g., is too inconsistent over time), the reverse power supplied via the particular PoE line may be omitted from the MU-ONT power load distribution. That is, any reverse power supplied by the particular PoE may not be included in the power delivered to MU-ONT. In some implementations, the reverse power supplied by the particular PoE may be actively prevented from being delivered to the MU-ONT.

At a block 508, the method 500 may include causing the MU-ONT to be supplied with reverse power received via the set of PoE lines in accordance with the distribution. In some embodiments, the block 508 may include utilizing passive load sharing techniques, such as by connecting the PoE lines (e.g., as respective reverse power sources) in parallel. The block 508 may additionally or alternatively include utilizing active load sharing techniques (not shown). For example, when the determined distribution of the MU-ONT load is an equal or even distribution, the method 500 may include using one or more active load sharing techniques to maintain the equal or even distribution of the MU-ONT load across multiple PoE lines. Examples of active load sharing may include using droop sharing techniques (e.g., decreasing the voltage of each PoE line as a load current of the MU-ONT increases), active current sharing techniques (e.g., monitoring the current of each PoE line and adjusting the respective power and/or voltage supplied by each PoE line based on the current measurements), and/or other feedback techniques or mechanisms which control the respective contributions of reverse power supplied by the multiple PoE lines to be relatively even or equal contributions.

In some embodiments, the block 508 may include causing the MU-ONT to be supplied with power of a desired or requested voltage (not shown). In these embodiments, the block 508 may include utilizing a control or feedback loop to control the power provided to the MU-ONT to be of the desired or requested voltage. For example, the block 508 may include maintaining a constant voltage of the power provided to the MU-ONT irrespective of changes in input voltages of the PoE lines and irrespective of the conditions of the MU-ONT load, e.g., via a first control or feedback loop. In another example, the block 508 may include adjusting the voltage of the power provided to the MU-ONT based on measured current respectively supplied by the multiple POE lines to thereby balance the power load among the multiple PoE lines, e.g., via a second control or feedback loop. Of course, other techniques to control load sharing across multiple PoE lines may be possible.

Although the above discussion refers to multi-unit buildings in which different units are associated with different customers of the PON and thus include different TUs via which the different customers receive optical services, it will be easily understood by one skilled the art that the above discussion may be easily applied to a building which is associated with a single customer and in which multiple TUs are located. Such a building may include, for example, a single family home having multiple CPEs disposed within the home, or an apartment building where the landlord or management company manages the entire building's optical services.

Further, although the above discussion refers to services being provided by a passive optical network, the techniques, methods, and systems are easily applied by one skilled in the art to other types of service networks, such as copper and/or other types of digital networks, cellular and/or other types of wireless communications networks, hybrid transport communications and/or data networks, etc.

ADDITIONAL CONSIDERATIONS

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:
   obtaining, by one or more processors, an indication of a power load of a Multi-Unit Optical Network Terminal (MU-ONT) disposed on an exterior of a building,
      the MU-ONT optically connected to a passive optical network (PON) and communicatively connected, via a set of Power over Ethernet (PoE) lines, to one or more terminating units (TUs) disposed within an interior of the building, the set of PoE lines including multiple PoE lines, and
      the MU-ONT configured to receive, via the PON, optical signals and transmit, via the multiple PoE lines to respective TUs, respective payloads of the received optical signals;
   determining, by the one or more processors, a distribution of the power load across the multiple PoE lines based on respective measures of a consistency of a characteristic of two or more PoE lines of the multiple PoE lines; and
   causing the MU-ONT to be supplied with reverse power received via the multiple PoE lines in accordance with the distribution.

2. The method of claim 1, wherein:
   the building is a multi-unit building;
   a particular TU of the one or more TUs is disposed in a common area of the interior of the multi-unit building; and
   the causing of the MU-ONT to be supplied with the power received via the multiple PoE lines includes causing the MU-ONT to be supplied with reverse power received via a PoE line terminating at the particular TU.

3. The method of claim 1, wherein:

the building is a multi-unit building;

the one or more TUs disposed within the interior of the building include multiple TUs;

each TU of the multiple TUs services a different unit of the building and is communicatively connected to the MU-ONT via a respective PoE line; and the causing of the MU-ONT to be supplied with the reverse power received via the multiple PoE lines includes causing the MU-ONT to be supplied with an aggregation of the reverse power received via the multiple PoE lines corresponding to the multiple TUs.

4. The method of claim 1, wherein the causing of the MU-ONT to be supplied with the reverse power received via the multiple PoE lines in accordance with the distribution includes utilizing active load sharing across at least two PoE lines of the multiple PoE lines.

5. The method of claim 4, wherein the utilizing of the active load sharing includes utilizing droop sharing or active current sharing across the at least two PoE lines of the multiple PoE lines.

6. The method of claim 1, wherein the the determining of the distribution of the power load across the multiple PoE lines includes omitting, from the distribution, respective supplies of reverse power provided by at least one PoE line of the multiple PoE lines.

7. The method of claim 1, wherein the the determining of the distribution of the power load across the multiple PoE lines includes balancing the distribution of the power load across at least two PoE lines of the multiple PoE lines.

8. The method of claim 1, wherein the characteristic of the two or more PoE lines I includes a current.

9. The method of claim 1, further comprising omitting, from the distribution, a supply of power provided by a particular PoE line of the multiple PoE lines based on the measure of the consistency of the characteristic of the particular PoE line.

10. The method of claim 9, wherein the characteristic of the particular PoE line is a voltage of the particular PoE line.

11. The method of claim 1, wherein the characteristic of the two or more PoE lines includes a voltage.

12. A system, comprising:

one or more tangible memories storing thereon computer-executable instructions that, when executed by one or more processors, cause the system to:

obtain an indication of a power load of a Multi-Unit Optical Network Terminal (MU-ONT) disposed on an exterior of a building, the MU-ONT optically connected to a passive optical network (PON) and communicatively connected, via a set of Power over Ethernet (PoE) lines, to one or more terminating units (TUs) disposed within an interior of the building, the set of PoE lines including multiple PoE lines, and the MU-ONT configured to receive, via the PON, optical signals, and transmit, via the multiple PoE lines to respective recipient TUs, respective payloads of the received optical signals;

determine, a distribution of the power load of the MU-ONT across the multiple PoE lines based on respective measures of a consistency of a characteristic of two or more PoE lines of the multiple PoE lines; and cause the MU-ONT to be supplied with reverse power received via the multiple PoE lines in accordance with the distribution.

13. The system of claim 12, wherein:

the building is a multi-unit building;

a particular TU of the one or more TUs is disposed in a common area of the interior of the multi-unit building; and the reverse power received via the multiple PoE lines includes reverse power received via a PoE line terminating at the particular TU.

14. The system of claim 12, wherein:

the one or more TUs disposed within the interior of the building include multiple TUs;

each TU of the multiple TUs is communicatively connected to the MU-ONT via a respective PoE line; and the reverse power received via the multiple PoE lines includes an aggregation of the reverse power received via the multiple PoE lines corresponding to the multiple TUs.

15. The system of claim 12, wherein the reverse power received via the multiple PoE lines includes power that has been injected into at least one PoE line of the multiple PoE lines.

16. The system of claim 12, wherein the one or more tangible memories are included in the MU-ONT.

17. The system of claim 12, further comprising an MU-ONT reverse powering (RP) device coupled to the MU-ONT and at which the multiple PoE lines are received, the MU-ONT RP device including (i) one or more power output ports via which the reverse power received via the multiple PoE lines is supplied to the MU-ONT, and (ii) one or more data ports via which signals generated by the one or more TUs and received via the multiple PoE lines are provided to the MU-ONT; and wherein the one or more tangible memories are included in the MU-ONT RP device.

18. The system of claim 12, wherein the distribution of the power load across the multiple PoE lines includes active load sharing across at least two PoE lines of the multiple PoE lines.

19. The system of claim 12, wherein the determination of the distribution of the power load across the multiple PoE lines includes an omission, from the distribution, of respective supplies of power received via at least one PoE line of the multiple PoE lines.

20. The system of claim 12, wherein the distribution of the power load across the multiple PoE lines includes a balanced distribution of the power load across at least two PoE lines of the multiple PoE lines.

21. The system of claim 12, wherein the characteristic of the two or more PoE lines includes a current.

22. The system of claim 12, wherein the distribution of the power load across the multiple PoE lines includes an omission, from the distribution, of a respective supply of power provided by a particular PoE line of the multiple PoE lines based on the measure of the consistency of the characteristic of the particular PoE line.

23. The system of claim 22, wherein the measure of consistency of the characteristic of the particular PoE line includes a measure of consistency of a voltage of the particular PoE line.

24. The system of claim 12, wherein a voltage of the reverse power supplied to the MU-ONT is adjusted based on at least one characteristic of the set of PoE lines.

25. The system of claim 12, wherein a voltage of the reverse power supplied to the MU-ONT is adjusted based on a change in the power load of the MU-ONT.

26. The system of claim 12, wherein the MU-ONT is further configured to:
- receive, via the set of PoE lines, signals that are generated by the one or more TUs and that correspond to optical services; and
- transmit, via the PON, optical signals including payloads of the signals generated by the one or more TUs.

27. The system of claim 12, wherein the MU-ONT is an Optical Line Terminal (OLT), a Multi Dwelling Unit (MDU) ONT, a switch, or a router.

28. The system of claim 12, wherein the characteristic of the two or more PoE lines includes a voltage.

* * * * *

UNITED STATES PATENT AND TRADEMARK OFFICE
CERTIFICATE OF CORRECTION

PATENT NO. : 12,381,635 B1
APPLICATION NO. : 18/957328
DATED : August 5, 2025
INVENTOR(S) : Erwin Wardojo et al.

Page 1 of 1

It is certified that error appears in the above-identified patent and that said Letters Patent is hereby corrected as shown below:

In the Claims

At Column 23, Line 23, "the the" should be -- the --.

At Column 23, Line 28, "the the" should be -- the --.

Signed and Sealed this
Sixteenth Day of December, 2025

John A. Squires
*Director of the United States Patent and Trademark Office*